United States Patent [19]

Martin

[11] 3,998,245
[45] * Dec. 21, 1976

[54] SEAL ASSEMBLIES FOR WATER WELL CASINGS

[76] Inventor: Carlyle J. Martin, Pierce Creek Road, R.D. No. 1, Binghamton, N.Y. 13903

[*] Notice: The portion of the term of this patent subsequent to Nov. 4, 1992, has been disclaimed.

[22] Filed: July 14, 1975

[21] Appl. No.: 595,851

Related U.S. Application Data

[63] Continuation-in-part of Ser. No. 493,526, Aug. 1, 1974, Pat. No. 3,917,292.

[52] U.S. Cl. .................................. 138/89; 277/110
[51] Int. Cl.² .................................. F16L 55/10
[58] Field of Search .................. 138/89, 90, 92, 94; 277/58, 107, 110, 111, 113, 166, 188

[56] References Cited

UNITED STATES PATENTS

| | | | |
|---|---|---|---|
| 2,855,003 | 10/1958 | Thaxton | 138/90 |
| 3,051,200 | 8/1962 | Bevington | 138/89 |
| 3,613,936 | 10/1971 | Kaiser et al. | 138/89 X |
| 3,802,466 | 4/1974 | Panella | 138/89 |
| 3,901,167 | 8/1975 | Reese | 138/89 X |
| 3,917,292 | 11/1975 | Martin | 277/110 |

Primary Examiner—Robert I. Smith
Attorney, Agent, or Firm—Richard G. Stephens

[57] ABSTRACT

An economical easily-installable and easily-removable seal assembly for use on water well casings comprises a dome having a vertically-movable central shaft fastened to a lower flange means so that rotation of a nut to lift the shaft compresses a rubber ring between the flange means and a lower rim of the dome, radially expanding the ring to grip the inside of a well casing with uniform pressure around the periphery of the ring, and also compresses an upper ring between the dome and the shaft.

9 Claims, 3 Drawing Figures

SEAL ASSEMBLIES FOR WATER WELL CASINGS

This application is a continuation-in-part of my prior, copending, similarly entitled application Ser. No. 493,526 filed Aug. 1, 1974 and now U.S. Pat. No. 3,917,292.

My invention relates to improved seals for the upper ends of the casings of water wells, and more particularly, to improved seals which are easier to install and remove, and which are economical to fabricate.

Water wells utilized at suburban and rural residences in a large part of the United States ordinarily use a well casing, typically comprising plural sections of pipe 5 to 7 inches in diameter, which are welded (or threaded) together to extend 50 to 500 feet down into the earth to a water layer. A submersible electric motor-driven pump is immersed in the water layer near the bottom of the casing, being suspended from near the top of the casing by a water pipe, typically one inch in diameter, up which water is pumped. In geographical locations which are not frost free, the water pipe ordinarily extends outwardly through the side of the well casing two or three feet below ground level and then is routed underground to the residence. The upper end of the well casing extends typically 6 to 18 inches above ground level, so that ground surface water may not run into the casing and contaminate the well. It is necessary that an air passage or vent be provided near the top of the well casing, so that pumping of water from the well not create a partial vacuum inside the well casing to prevent or impede water delivery. It is also necessary that an opening be provided near the top of the casing for an electrical cable needed to supply power to the motor of the submersible pump. It is important that such openings not allow rain water, vermin or insects to enter the well casing. While simple devices such as a plate with the required openings conceivably could be permanently welded or otherwise affixed to the top end of a well casing, the fact that the motor-pumps fail and sometimes must be replaced dictates that some form of removable seal or cap be provided, and various forms of removable well seals or caps are presently widely used.

Some well casings use successive threaded sections of pipe, while others have successive sections welded together. While it is theoretically possible in threaded casing installations to provide a removable well cap which theadedly engages theads provided at the upper end of the well casing, caps which thread into the well casing are deemed impractical for a number of reasons. Turning a theaded cap to install it would undesirably twist the electrical cable which must pass through it, unless the cable passed through an opening in the cap so large that insects or rainwater could also pass through the opening. Also, prohibitively great forces often would be required to unscrew a threaded cap which had been exposed to weather for some years. For such reasons, practical removable well caps cannot be threaded onto the upper ends of well casings, and the well caps in common use instead use seals including rubber rings which may be tightly clamped to the upper end of a well casing.

Various known well seals comprise plural metal plates between which a circular rubber seal is disposed, with means for clamping the plates very tightly together to radially expand the rubber seal, whereby the rubber seal is pressed tightly against the inside or the outside of the well casing. To insure that the rubber seal is adequately compressed around its entire periphery so as to form a watertight seal, the prior seals use a number of bolts spaced around the seal, each of which must be tightened with substantial force. Several important disadvantages of prior seals stem from their use of a plurality of bolts, or plurality of bolts and nuts. The bolts and nuts frequently must be installed under adverse climatic conditions. If bolts or nuts are accidentally dropped they are frequently lost in mud, snow or the like at a well site. Also, the drive shoe of a well-drilling rig often provides a hole in the earth exceeding the outer diameter of the well casing, leaving a space surrounding the casing in which bolts and nuts may be irretrievably lost should they be accidentally dropped therein. One object of the present invention is to provide an improved seal assembly of a "single-piece" nature, i.e. which does not require the tightening and loosening of a plurality of bolts and or nuts to install or remove the assembly. By provision of a single bolt means, the present invention allows a seal assembly to be installed or removed much more rapidly than prior assemblies, thereby providing a significant savings in labor costs.

As well as being lost during installation, well seal assemblies which utilize numerous bolts and nuts are disadvantageous because such parts are sometimes lost or mis-placed between the factory and the well site. One object of the invention is to provide a well seal assembly which may be completely assembled at the factory, and which then need not later be disassembled to allow its installation atop a well casing.

Prior art seal assemblies which use a plurality of bolts and/or nuts spaced around the seal are also disadvantageous in that their threads sometimes become jammed or may be inadvertently stripped, sometimes ruining a seal assembly unless it is re-bored and re-tapped with a larger threaded hole, or sometimes requiring that spare bolts or nuts be obtained. Another object of the invention is to provide an improved seal assembly which obviates such problems. The bolts of prior seal devices which squeeze a circular rubber ring between metal plates must be tightened with amounts of force which are unnecessarily great, which tends to lead to stripping of threads or the breaking of bolts, and the excessive forces do not efficiently provide an increase in sealing effectiveness. Another object of the invention is to provide an improved seal assembly which provides more effective sealing, and does not without a need to apply excessive forces to any of its parts.

A further disadvantage of seals using plural bolts and nuts spaced around the seal is that they must be tightened evenly, i.e. by tightening a given bolt only partially and then proceeding to similarly tighten each of the other bolts before further tightening the given bolt, or else the seal assemblies, which frequently are made of cast iron, may fracture. Another disadvantage is that provision of plural independent bolts may cause the seal to grip tightly at some places around its periphery, but to grip much less tightly at other places, so that leaks may occur. An additional object of the invention is to provide an improved well seal assembly which does not require sequential tightening of a plurality of bolts and/or nuts, and a further object of the invention is to provide an improved well seal assembly which automatically expands a seal ring evenly around its entire periphery as a single bolt-means is tightened.

The invention claimed in the mentioned copending application overcomes many disadvantages of the prior art by provision of a cap having a shaft extending vertically therethrough, with means to prevent vertical movement of the shaft as the shaft is rotated, so that a flange means either threaded on the shaft, or supported by other means threaded on the shaft, will be moved upwardly to compress a seal ring. An object of the present invention is to provide alternative arrangements which also overcome the disadvantages of the prior art. In accordance with the present invention, I also provide a cap having a shaft extending vertically therethrough, but rather than being prevented from moving vertically, the shaft is arranged to move vertically in order to compress the seal ring, and as will become clear below, compression of the seal ring may be arranged to occur either by upward shaft movement in some embodiments, or by downward shaft movement in other embodiments.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
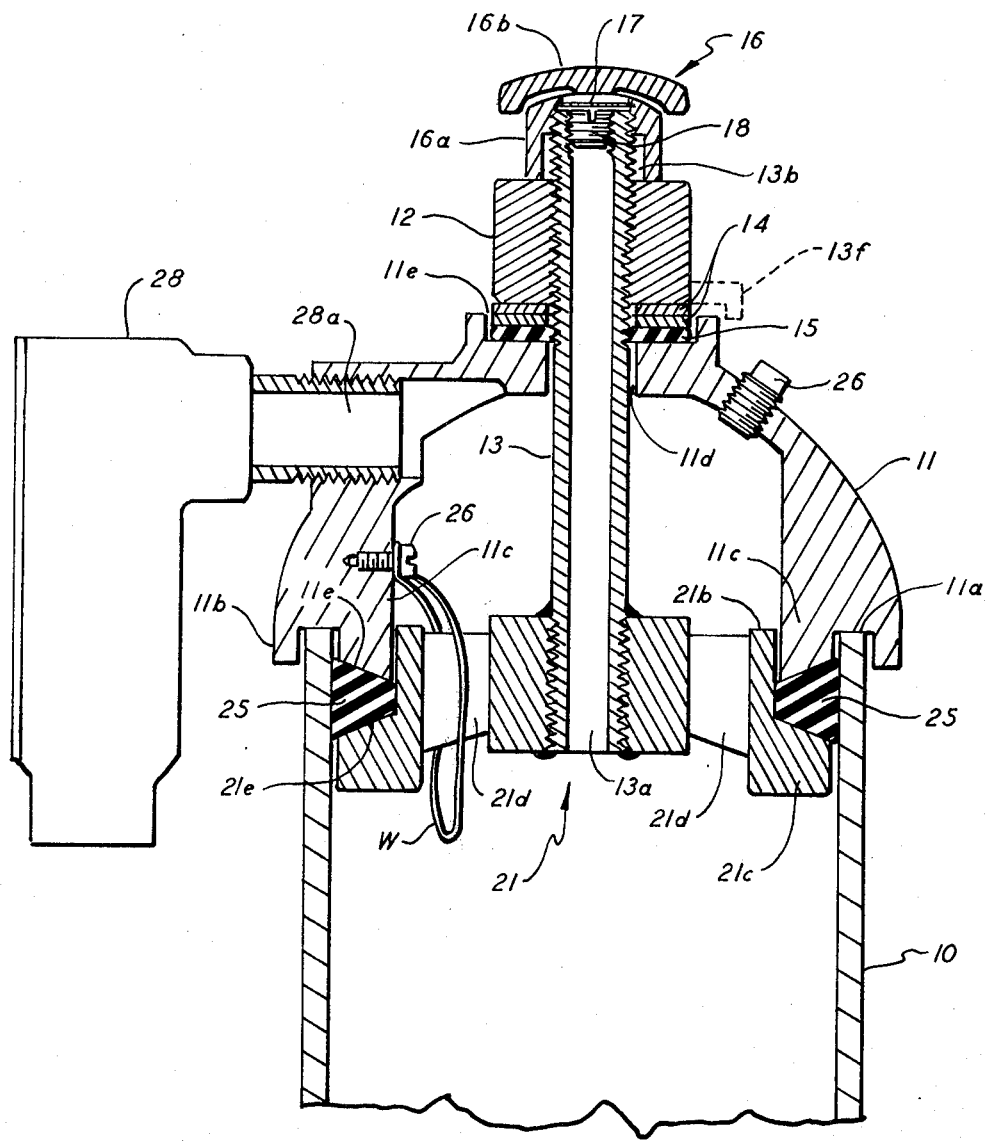
FIG. 1 is a side elevation view in cross-section of a preferred form of the present invention.

In FIG. 1 the upper end of a section of well casing pipe is shown at 10. The improved seal assembly comprises a dome 11 of generally hemispherical shape having an annular groove, the upper surface 11a of which sits atop the upper end of casing 10. An annular outer flange 11b extends below surface 11a, forming a dip edge, so that water running down the outside of dome 11 cannot enter the well casing. An inner annular flange 11c extends downwardly into the casing a short distance, as shown. The width of the groove between flanges 11b and 11c is not critical, and is made to exceed the wall width of standard casing pipe, so that the dome may be laid atop the casing without the need for a "press-fit." The outer surface of inner flange 11c is preferably made slightly less (e.g. one-sixteenth inch) than the inside diameter of casing 10 so that placing dome 11 atop the casing accurately aligns the dome with the casing. Inasmuch as the seal assembly grips the inside of the well casing, it is immaterial whether the exterior of the well casing is threaded or not.

The water pipe extends from the pump (not shown) near the bottom of the well casing to a point about three feet below the top of the casing, where a known form of device known as a "pitless adapter" (not shown) supports the weight of the water pipe and pump and allows the water pipe to extend laterally through the wall of the casing, from where it may run underground to the residence. Dome 11 is provided with a tapped hub at 28a which accommodates a threaded nipple from standard conduit or cable fitting 28, through which wires or electrical cable (not shown) may pass, with the cable extending down the inside of the well casing to the motor-pump. A removable plug 26 is also preferably threaded into a tapped hole through dome 11.

Dome 11 is provided with a central upper bore 11d through which an upper portion of shaft 13 passes. Shaft 13 is shown as comprising a length of hollow pipe having exterior and interior threads at its upper end. Bore 11d need not closely correspond in diameter with the portion of shaft 13 passing through it, and indeed is preferably made somewhat oversize, so as to allow an appreciable amount of "rocking" of the axis of shaft or pipe 13 relative to the axis of bore 11d. A nut 12 is shown threaded on shaft 13, atop metal washers 14,14 which in turn sit atop rubber (or other elastomeric) washer 15, washers 14 and 15 being situated in a circular recess 11e in the top of dome 11. If desired, nut 12 may be provided with a depending flange of the nature shown in dashed lines at 13f, to prevent the accumulation of water on washers 14 and 15, although such a refinement is deemed ordinarily unnecessary. The upper threaded end of pipe or shaft 13 engages internal threads in the depending hub portion 16a of vent cap 16. Cap 16 comprises a generally hollow dome portion 16b connected to hub 16a by a plurality of ribs so that air may flow between the interior of hub portion 16a and the outside of cap 16, through a screen 17 situated inside dome 16b atop hub portion 16a of cap 16. The upper end of passage 13d is preferably internally threaded to receive a small plug 18.

The lower end of shaft 13 is fixedly attached, as by means of brazing or welding, for example, to central hub 21a of a lower flange means 21, which integrally includes an annular ring portion 21b and an annular lower flange 21c supported by and spaced from hub 21a by a plurality of arms or web members 21d, only two of which are visible in FIG. 1. The electrical calbe (not shown) may pass between a pair of the web members to reach the pump near the bottom of the well. The lower flange means 21 comprised of portions 21a–21d is preferably cast as a single piece. It will be seen that the entire assembly may be carried in one piece, i.e. that no loose parts such as additional nuts and/or bolts are required and susceptible to loss or mis-placement prior to placement of the assembly atop the well casing. An annular rubber (or other elastomeric) ring 25 surrounds ring 21b.

Nut 12 is preferably provided with a cylindrical periphery so that it may be gripped by an ordinary pipe wrench, although it may be provided with flat surfaces to allow alternative use of another form of wrench. As nut 12 is rotated by a wrench, lower flange means 21 will be seen to be drawn upwardly, assuming that it does not rotate with shaft 13. If, before the assembly is seated atop the well casing, lower flange 21 and shaft 13 are lightly screwed by hand into nut 12 so as to slightly engage and squeeze rubber ring 25, sufficient friction will be provided between ring 25 and lower flange means 21 that the latter will not rotate as nut 12 is rotated. As nut 12 is rotated, ring 25 then will be compressed tightly between the upper face 21e of lower flange 21c and the lower face 11e of inner flange 11c, and due to the compressibility of ring 25, portions of it will be urged radially outwardly against the inside wall of the well casing 10, and portions of it will be urged radially inwardly against the vertical outer face of ring portion 21b. Rotation of nut 12 causes lower flange means 21 to apply a very large upward force to dome 11 through ring 25, but also causes nut 12 to apply an equal downward force to dome 11 via washers 14 and 15, with the result that no appreciable net vertical force is applied to dome 11, and it continues to rest atop the well casing 10, with the weight of the pipe wrench tending to hold it atop casing 10 as nut 12 is rotated. Lower flange means 21 and shaft 13 will be seen to move upwardly, without rotating, as nut 12 is rotated to install the seal. Because of the tremendous mechanical advantage obtainable by means of the threads on shaft 13 and in nut 12, sufficient compression to securely lock the seal assembly in the end of casing 10 is readily achieved. As nut 12 is rotated to lock the seal assembly in place, it will be seen to press metal washer 14 downwardly, compressing rubber washer 15, thereby to provide a watertight seal at the top of dome 11.

As compression of ring 25 expands the ring radially, the ring will tend to be compressed with equal pressures against ring 21b and the inside of the well casing at all locations around the periphery of the ring 25. Due to the slight oversize of bore 11d, shaft 13 may pivot slightly in bore 11d so as to tend to equalize the compressive forces all around the ring, and the lower portion of shaft 13 may deflect slightly, so that equal forces are applied around the entire seal, even if none of the mentioned portions of the assembly are machined to close tolerances. Such an arrangement using a ring-type seal has marked advantages over prior seals of a circular pad type. With the arrangment shown, a large percentage of the applied compressive force acts to expand the seal ring radially, while much of the force applied to a circular pad, as distinguished from a ring, acts to merely compress central portions of the circular pad, without materially expanding the pad radially.

If and when it becomes necessary to remove the seal assembly, so as to withdraw the motor-pump, for example, the seal assembly may be easily removed by rotating nut 12 in the reverse direction by means of a wrench, thereby lowering lower flange means 21 so that rubber ring 25 is no longer compressed by it, and then the assembly may be lifted off of the casing. After long usage, the rubber ring 25 may tend to stick to the inside of the casing even if it is no longer being squeezed. Shaft 13 and lower flange means 21 then will not lower as nut 12 is rotated, and instead nut 12 will move upwardly along shaft 13. One or a few downward hammer blows on vent cap 16, or preferably on nut 12 after removing the vent cap, then will readily break the rubber ring loose from the inside of the casing. As the assembly is lifted from the casing, flange 21c lifts the rubber ring out of the casing, lifting all portions of it even if it should be broken into several pieces, so that none of the pieces fall down inside the casing.

Well seal asemblies are frequently removed, after many years of use, by persons who are not familiar with the internal construction of such seals, and if bolts which tighen various prior art seals are loosened too much, nuts or other parts may drop down inside the well casing and be irretrievably lost. Provision of a piece of wire W looped around one arm 21d of the lower flange assembly and fastened to the interior of the dome prevents lower flange means and shaft 13 from falling down into the well even if someone completely removes nut 12 from shaft 13. Hence it will be clear that no parts of the assembly can drop down inside the well casing.

A further feature of the invention is its versatility in allowing the well to be vented in a variety of different ways. If plug 18 is removed, venting may occur through vent cap 16 and passages 13d, 13e. Alternatively, in some applications, such as where it is preferred that a vent line be attached leading from an area (such as from inside a residence) where a preferred source of air is located, plug 18 may be left in place and plug 26 removed, and replaced by a conventional tubing connector. In some applications both plugs 18 and 26 may be left in place and venting allowed to occur through conduit or cable fitting 28 and any conduit (not shown) connected thereto.

Figure 2:
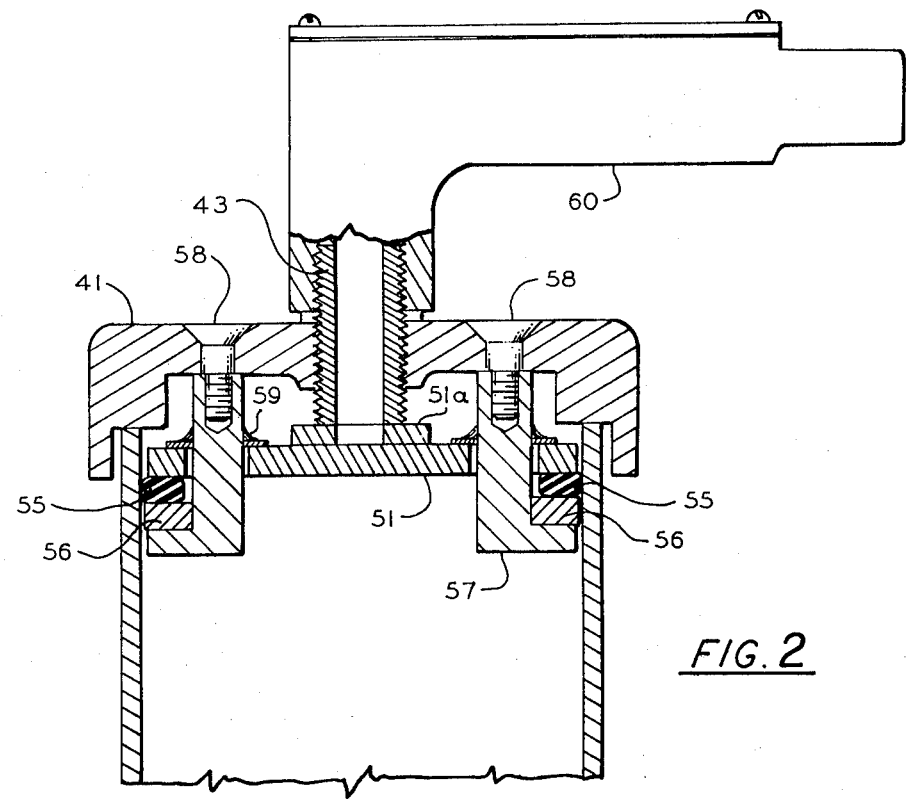
FIG. 2 is a side elevation view in cross-section illustrating one alternative embodiment of the invention.
Figure 2A:
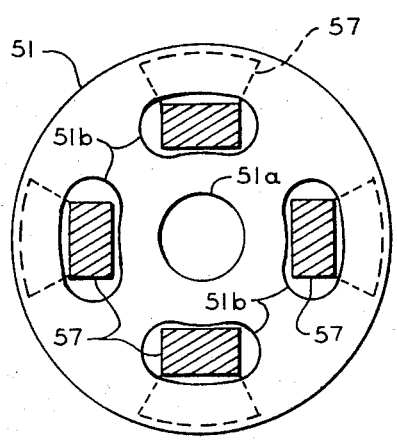
FIG. 2a is a plan view showing several portions of the assembly of FIG. 2.

In a modified embodiment of the invention shown in FIG. 2 the "dome" of the assembly is shown as comprising a substantially flat cap 41 having a threaded central bore through which hollow screw shaft 43 is threaded. The lower end of shaft 43 rotatably engages a ring-shaped boss 51a on plate means 51. As shaft 43 is turned into cap 41, by rotating the conduit fitting 60, for example, into which the upper end of shaft 43 is threaded, plate 51 is urged downwardly relative to the cap, compressing rubber ring 55 against lower ring 56, and hence radially expanding ring 55 so that it will engage the well casing. The outer edge of plate 51 and the upper surface of ring 56 is preferably beveled in the manner previously shown in FIG. 1, to prevent much of the rubber from being pushed inwardly. Metal lower ring 56 is suspended or prevented from lowering relative to cap 41 by a plurality of arms 57,57 which are fastened at their upper ends to cap 41, and which extend downwardly through holes or arcuate slots in plate 51 and then radially outwardly to engage the underside of ring 56. Only two arms 57 are shown in FIG. 2, but a larger number may be used, all preferably spaced equidistantly apart around the assembly. In FIG. 2a four arms 57 are shown extending through respective arcuate slots 51b in plate 51. Neither ring 56 nor ring 55 are shown in FIG. 2a. Arms 57 are shown fastened to cap 41 by means of screws 58,58, which are preferably countersunk, provided with no drive slot, and painted over, and indeed screws 58 and/or arms 57 may be welded to cap 40 once they have been inserted through slots 51b in plate 51. Alternatively, sheet metal retaining clips 59 may be inserted on arms 57 above plate 51 so that no arm may fall into casing 10 even if screws 58 are allowed to be loosened.

Provision of wire W and fastener 26 is not necessary in the device of FIG. 1, and in some embodiments these parts will be omitted. Instead, after nut 12 has been partly screwed onto shaft 13, a small portion of the threading on shaft 13 just above nut 12 is deformed or mashed, as at the area shown at 13b in FIG. 1. With threads above nut 12 deformed, the nut may be turned in the direction to lift lower flange means 21 to clamp the seal assembly in place as heretofore described. However, when the nut is later turned in the opposite direction to remove the seal, complete removal of the nut 12 is prevented by the deformed threads. The initial turning of the nut will allow the shaft 13 to move downwardly, relaxing the upward pull on the seal ring 25. Lower flange means 21 and shaft 13 then will be free to turn, and will turn as nut 12 encounters the deformed threads, thereby preventing the workman from completely removing nut 12.

While two metal washers have been shown at 14, only a single such washer may be used. In FIG. 1 seal ring 25 is assumed to comprise a resilient ring having a rectangular relaxed cross-sectional configuration, which is forced into the trapezoidal cross-section shown by the provision of beveled surfaces on upper flange 11c and lower flange 21c. The use of such beveled surfaces is not strictly necessary, i.e. one or both of surfaces 11e and 21e may extend horizontally, although the use of beveled surfaces tends to enhance the gripping action of the seal. A rubber seal ring of trapezoidal cross-section also may be used with either horizontal or beveled flange surfaces. Two (or even more) seal rings may be used, if desired, in a manner shown in my copending application.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A well seal assembly for sealing the upper end of a hollow cylindrical well casing, comprising, in combination: a cap having an annular first flange adapted to extend into said casing adjacent the inner wall of said casing and a bore extending through said cap substantially along the cylindrical axis of said casing; shaft means extending through said bore of said cap means; a lower flange adapted to be situated within said casing and be supported by said shaft means, said lower flange means having an annular surface; a compressible seal ring situated between said first flange and said surface of said lower flange means; and tightening means engaging a portion of shaft means above said bore for raising said shaft means and said lower flange means relative to said cap means to compress said compressible seal ring between said first flange and said lower flange means, causing radial expansion of said seal ring against said inner wall of said casing.

2. The assembly according to claim 1 wherein said portion of said shaft means above said bore is threaded, and said tightening means comprises a threaded nut engaging said threaded portion of said shaft means.

3. The assembly according to claim 1 wherein said cap means includes a flat upper surface portion surrounding said bore and wherein said assembly includes washer means situated between said flat upper surface portion and said tightening means.

4. The assembly according to claim 1 wherein said shaft means includes a passageway extending through said portion of said shaft means.

5. A well seal assembly for sealing the upper end of a hollow cylindrical well casing, comprising, in combination: a cap having an annular first flange adapted to extend into said casing adjacent the inner wall of said casing and a bore extending through said cap substantially along the cylindrical axis of said casing; shaft means extending through said bore of said cap means; a member situated within said casing to be moved along said axis by movmement of said shaft means along said axis, said member having an annular surface facing said annular first flange; a compressible seal ring situated between said annular first flange and said annular surface; and means for moving said shaft means along said axis, whereby movement of said member toward said first flange compresses said seal ring between said first flange and said annular surface, causing radial expansion of said seal ring against said inner wall of said casing.

6. The assembly according to claim 5 wherein said means for moving said shaft means along said axis comprises mating screw threads on said shaft means and said cap.

7. The assembly according to claim 5 wherein said means for moving said shaft means along said axis comprises a nut engaging a threaded portion of said shaft means above said bore in said cap.

8. The assembly according to claim 5 wherein said annular first flange is situated below said member and connected to an upper portion of said cap by a plurality of legs which extend through openings through said member, and the lower end of said shaft means butts against said member to urge said member downwardly.

9. The assembly according to claim 5 wherein said annular first flange is situated above said member and said member is rigidly affixed to said shaft means.

* * * * *